United States Patent
Faher et al.

(10) Patent No.: US 12,170,721 B2
(45) Date of Patent: Dec. 17, 2024

(54) METHOD FOR CONTROLLING VALIDITY OF AN ATTRIBUTE

(71) Applicant: THALES DIS FRANCE SAS, Meudon (FR)

(72) Inventors: Mourad Faher, Marly le Roi (FR); Gérald Maunier, Sanary (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/768,239

(22) PCT Filed: Sep. 28, 2020

(86) PCT No.: PCT/EP2020/077039
§ 371 (c)(1),
(2) Date: Apr. 12, 2022

(87) PCT Pub. No.: WO2021/073855
PCT Pub. Date: Apr. 22, 2021

(65) Prior Publication Data
US 2024/0121078 A1    Apr. 11, 2024

(30) Foreign Application Priority Data
Oct. 18, 2019   (EP) ..................... 19306364

(51) Int. Cl.
*H04L 9/06* (2006.01)
*H04L 9/00* (2022.01)
*H04L 9/32* (2006.01)

(52) U.S. Cl.
CPC .......... *H04L 9/0643* (2013.01); *H04L 9/3247* (2013.01); *H04L 9/50* (2022.05)

(58) Field of Classification Search
CPC ....... H04L 9/0643; H04L 9/3247; H04L 9/50; H04L 9/3239
See application file for complete search history.

(56) References Cited

U.S. PATENT DOCUMENTS

| 11,949,788 | B1* | 4/2024 | Irazabal et al. | H04L 9/3242 |
| 2023/0353383 | A1* | 11/2023 | van Vredendaal | H04L 9/3247 |
| 2024/0080204 | A1* | 3/2024 | Van Vredendaal | H04L 9/3236 |

FOREIGN PATENT DOCUMENTS

WO    WO97/43842 A1    11/1997

OTHER PUBLICATIONS

International Search Report (PCT/ISA/210) and Written Opinion (PCT/ISA/237) mailed on Nov. 17, 2020, by the European Patent Office as the International Searching Authority for current International Application No. PCT/EP2020/077039—[13 pages].

(Continued)

*Primary Examiner* — Han Yang

(57) ABSTRACT

A device comprises a hash tree including a root node and a leaf node. An issuing authority having agreed to generate a signature of the root node after having successfully checked validity of an attribute stored in the leaf node. The device identifies a subset of nodes by using a template specifying the structure of the hash tree, said subset comprising, for all paths of the hash tree that do not comprise said leaf node, the node which is the closest to the reference root node and which does not belong to the path comprising said leaf node. A verifier computes a test hash and then computes a test root node by applying a preset rule. The verifier checks that the signature is valid using a data whose authenticity is certified by the issuing authority.

14 Claims, 3 Drawing Sheets

---

The first device 80 identifies a subset 60 of nodes by using the template. The subset 60 comprises, for all paths of the hash tree that do not comprise the leaf node 24 containing the hash computed from the attribute, the node which is the closest to the reference root node 92 and which does not belong to the path comprising said leaf node 24.  /S20

The first device provides a verifier device 70 with said reference root node 92, said signature 94, said attribute 10 and the subset 60 of nodes.  /S22

The verifier device computes a test hash by using said attribute then computes a test root node by applying a preset rule 75 to said test hash and the subset 60.  /S24

The verifier device performs a verification by checking that the test root node and reference root node 92 are equal and that the signature 94 is valid using a data 76 whose authenticity has been certified by the issuing authority 50 and considers the attribute as being valid only in case of successful verification.  /S26

(56) References Cited

OTHER PUBLICATIONS

Aiello W et al: "Fast Digital Identity Revocation", Advances in Cryptology. Crypto '98. 18th Annual International Cryptology Conference. Santa Barbara, Aug. 23-27, 1998. Proceedings; [Lecture Notes in Computer Science ; vol. 1462], Berlin . Springer, DE, Aug. 23, 1998 (Aug. 23, 1998), pp. 137-152, ISBN: 978-3-540-64892-5—sections 1-3; figure 1.

* cited by examiner

METHOD FOR CONTROLLING VALIDITY OF AN ATTRIBUTE

FIELD OF THE INVENTION

The present invention relates to methods for controlling the validity of an attribute. It relates particularly to methods of controlling that an attribute allocated to a user is valid.

BACKGROUND OF THE INVENTION

At the eve of mobile Identity and mobile application wallet development, the rise of personal data that are scattered amongst such applications requires a solid privacy protection hence by law with the European Regulation GDPR.

The complexity of existing authentication protocols and security policies to achieve privacy principles are such as their implementation often requires stringent measures like the Password Authenticated Connection Establishment (PACE) protocol for instance.

The data exchanged with the verifier generally requires several signatures to be applied onto the data (attributes) for authenticity and integrity (e.g. mobile security object with mobile Driving License application or SOD with ICAO passport proving content has been verified by an Issuing Authority, and signature from the mobile device to prove claims were delivered to this device and not cloned.)

There is a need to process personal data to preserve their confidentiality as verifiable claims.

SUMMARY OF THE INVENTION

The invention aims at solving the above mentioned technical problem.

An object of the present invention is a computer-implemented method for controlling the validity of an attribute which is allocated to a user. A first device (user's device) comprising a memory stores a hash tree including a reference root node. An issuing authority agreed to generate a signature of the reference root node after having successfully checked that the attribute is valid. A first hash computed by using said attribute is stored in a leaf node belonging to the hash tree. The structure of the hash tree is defined in a template stored in said memory. The attribute and the signature are stored in said memory. The method comprises the following steps:
  the first device identifies a subset of nodes by using the template, said subset comprising, for all paths of the hash tree that do not comprise said leaf node, the node which is the closest to the reference root node and which does not belong to the path comprising said leaf node,
  the first device provides a verifier device with said reference root node, said signature, said attribute and said subset,
  the verifier device computes a test hash by using said attribute then computes a test root node by applying a preset rule to said test hash and said subset,
  the verifier device performs a verification by checking that said test root node and reference root node are equal and that the signature is valid using a data whose authenticity is certified by the issuing authority and considers the attribute as being valid only in case of successful verification.

Advantageously, data provided by the first device to the verifier device may be in a predefined order.

Advantageously, said first hash may be computed by using both said attribute and a random value which may be provided to the issuing authority and the verifier device.

Advantageously, the hash tree may comprise a leaf node comprising a hash generated from an attribute set to either a random value or a fixed pattern.

Advantageously, the issuing authority may generate the signature and may provide said signature to the first device.

Advantageously, the issuing authority may certify a private key allocated to the first device and the first device may generate the signature by using said private key.

Advantageously, the first device may modify the structure of said hash tree and may update accordingly said template and the first device may trigger an update of the signature of the reference root node of said hash tree.

Another object of the present invention is a first device comprising a processor and a memory that stores a hash tree including a reference root node. An issuing authority agreed to generate a signature of said reference root node after having successfully checked that an attribute allocated to a user is valid. A first hash computed by using said attribute is stored in a leaf node belonging to the hash tree. The structure of said hash tree is defined in a template stored in said memory. The attribute and the signature are stored in said memory. The first device is configured to identify a subset of nodes by using said template. The subset comprises, for all paths of the hash tree that do not comprise said leaf node, the node which is the closest to the reference root node and which does not belong to the path comprising said leaf node. The first device is configured to provide a verifier device with said reference root node, said signature, said attribute and said subset of nodes.

Another object of the present invention is a verifier device comprising a storage area and a processor. The verifier device is configured to receive a reference root node of a hash tree, a signature of said reference root node, an attribute and a subset of nodes belonging to the hash tree. The verifier device is configured to compute a test hash by using said attribute then to compute a test root node by applying a preset rule to said test hash and said subset. The verifier device is configured to perform a verification by checking that said test root node and reference root node are equal and that the signature is valid using a data whose authenticity is certified by the issuing authority and to consider the attribute as being valid only in case of successful verification.

Another object of the present invention is a system including a first device according to the invention and a verifier device according to the invention.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of attribute (or claim) intended to be allocated to a user or a group of users. The user may be an individual or natural person, a legal person or a physical machine.

Each attribute may be an individual assertion like "age is over 21", "driving license is valid", "resident of New-York city", "nationality German", "graduated engineer", "female" or "level 2 certified" for a person.

Each attribute may be an individual assertion like "issued on Nov. 4, 2015", "Version 2.3", "installed in Germany", "issued by company XYZABCD", "owned by company ABCDWXYZ" for a machine.

It is well-suited for systems intended to manage a large number of attributes whose validity needs to be checked on the field.

Thanks to the invention, a single signature can be issued for a large set of attributes, allowing a verifier entity to check the validity and genuineness of a single attribute without disclosing to the verifier device other attributes belonging to the set.

Figure 1:
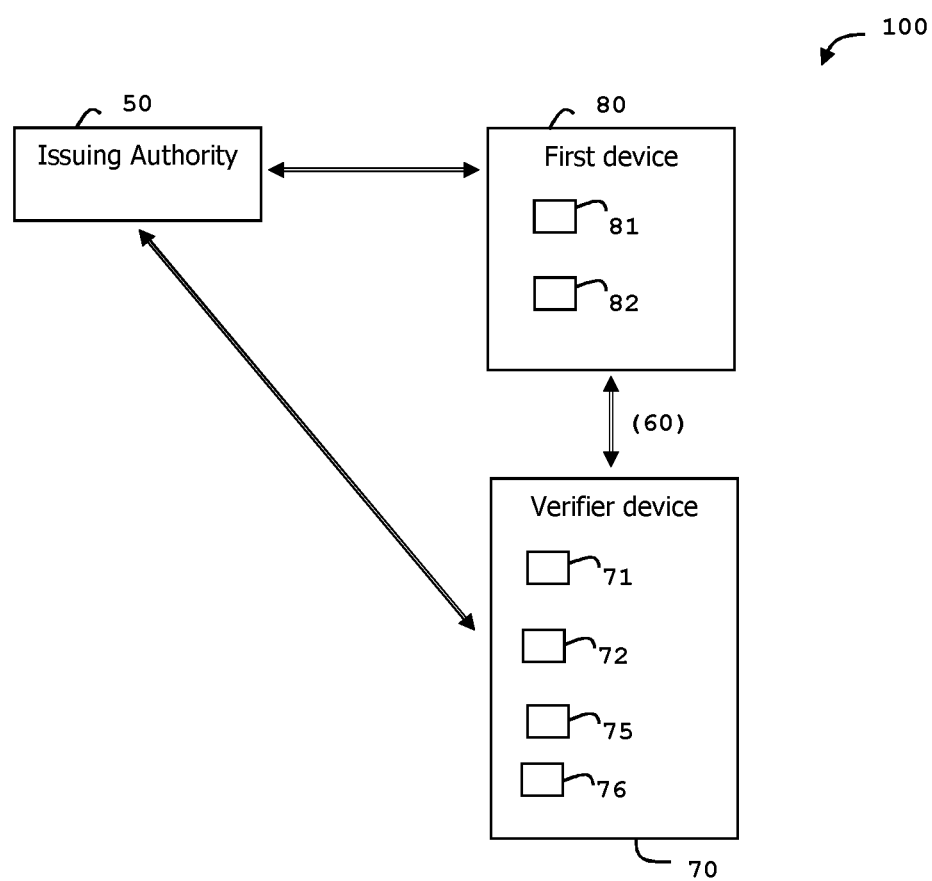
FIG. 1 is an example of architecture of a system according to the invention.

FIG. 1 shows an example of architecture of a system according to the invention.

In this example, the system 100 comprises an issuing authority 50, a hardware user's device (e.g. first device) 80 and a hardware Verifier device 70.

The issuing authority 50 can include a computer.

The first device 80 can be implemented as a physical machine comprising a processor 82 and a memory 81 storing instructions intended to be executed by the processor 82. For example, the user's device 80 can be a mobile phone, a laptop, a PDA, a tablet PC or a game console or a connected wearable device like a smart watch.

If the user is a machine, the user can be the user's device 80 itself.

The Verifier device 70 can be implemented as a physical machine comprising a processor 72 and a memory 71 storing instructions intended to be executed by the processor 72. The Verifier device 70 comprises at least one preset rule 75 which are designed to allow the Verifier device 70 to automatically perform a verification of validity of an attribute. For example, the Verifier device 70 can be a mobile phone, a PDA, a tablet PC or a portable computer machine. The Verifier device 70 comprises a data 76 whose authenticity is certified by the issuing authority 50. The data 76 is required to check the validity of the signature of the root node of the hash tree.

In one embodiment, the data 76 can be a public key (of a PKI key pair) allocated to the issuing authority 50. In one embodiment, the data 76 can be a certificate comprising the public key of the issuing authority 50.

In one embodiment, the data 76 can be a public key (or a certificate comprising the public key) allocated to the user's device 80 and certified by the issuing authority 50. In this case, the public key (or certificate) allocated to the user's device 80 has been signed using the private key of the issuing authority 50. Thus it can be trusted by using the public key of the issuing authority 50.

In one embodiment, the data 76 can be a secret key shared between the Verifier device 70 and the issuing authority 50.

The issuing authority 50, the user's device 80 and the Verifier device 70 can be configured to exchange data through secure communication channels in point to point mode. For this purpose, these three entities may comprise keys and cryptographic algorithms in order to securely exchange data.

Preferably the issuing authority 50 includes software instructions that, when executed by its processor, cause the issuing authority 50 to perform operations as described below for FIG. 2.

Preferably the user's device 80 includes software instructions that, when executed by its processor, cause the user's device 80 to perform operations as described below for FIG. 3.

Preferably the Verifier device 70 includes software instructions that, when executed by its processor, cause the Verifier device 70 to perform operations as described below for FIG. 3. Alternatively, the processing flow can be hard-coded in the verifier device 70 by implementing an API with at least a method allowing for the processing of a list of parameters comprising a root node value, a signature of the root node, an attribute and one or more intermediary hashes.

Figure 4:
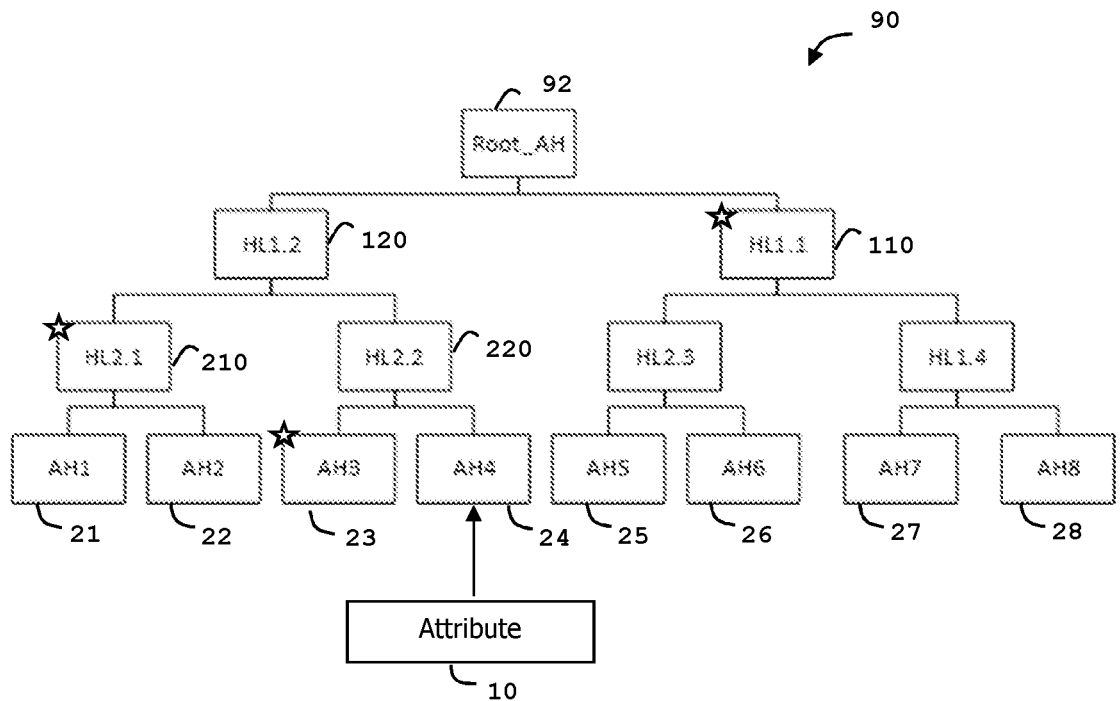
FIG. 4 depicts a diagram showing a hash three according to a first example of the invention.

FIG. 4 shows a diagram showing a binary hash three 90 according to an example of the invention.

A hash tree is a tree comprising a root node and several leaf nodes. It can comprise intermediate nodes (also called branch nodes) located between the root node and the leaf nodes. Every leaf node contains the hash of a data (i.e. attribute) uniquely associated to the leaf node.

In a binary hash tree, every non-leaf node (I.e. the root node and all the branch nodes) has two child nodes and comprises a hash computed from the content of its two child nodes. Generally the content of a branch node is computed as the hash of the concatenation of the contents of its two child nodes.

A hash can be computed using well-known cryptographic hash functions like SHA-2, SHA-256, SHA-384 or SHA-512.

A path is the sequence (ordered list) of nodes connecting the root node and a leaf node. The path comprises both the root node and the leaf node.

The root node can also be called master node or top node. Merkle trees are kind of binary hash tree.

A hash tree has its own depth which corresponds to the number of levels of nodes. For instance, the hash tree of FIG. 4 has a depth equal to four, wherein the Root node 92 (Root_AH) belongs to the first level, the branch nodes 110 (HL1.1) and 120 (HL1.2) belong to the second level and wherein the leaf nodes 21 to 28 (i.e. AH1 to AH8) belong to the fourth level.

The invention can be implemented by using a hash tree having a depth equal to or greater than two.

In the example of FIG. 4, the content of the leaf node 24 has been computed as a hash of the attribute 10. The attribute 10 may be an assertion allocated to a specific user like "boat license is valid", "resident of Atlanta", "subscription to service WXYZABCD is valid" or "born in South Africa".

Figure 2:
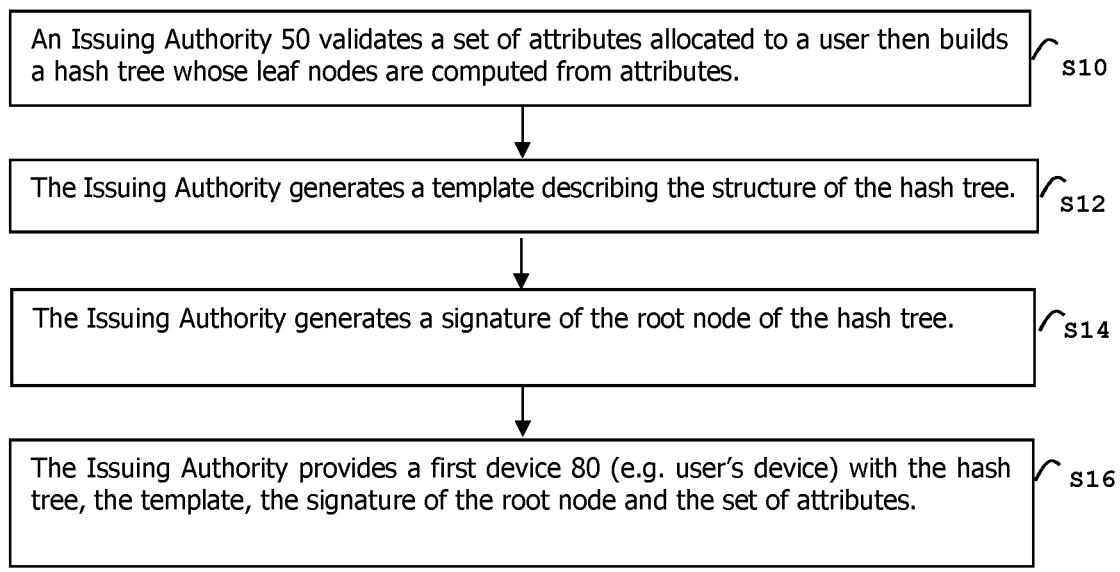
FIG. 2 depicts a flow chart for the enrolment of a set of attributes allocated to a user according to an example of the invention.

FIG. 2 shows a flow chart for the enrolment of a set of attributes allocated to a user according to an example of the invention.

At step S10, an Issuing Authority 50 validates a set of attributes allocated to a user. The validation of every attribute must be done carefully since the Issuing Authority is trusted by some other entities, in particular by the verifier device 70 of FIG. 1. Typically, a check of genuineness of a physical Identity document and other official documents can be performed for instance for validating the set of attributes.

Checking operations of verifiable credentials corresponding to each attribute can be done manually, by a machine or a combination of both.

Then the Issuing Authority 50 builds a binary hash tree whose leaf nodes are computed from the attributes of the set. Each attribute of the set is assigned a position in the ordered list of leaf nodes. The hash tree is allocated to the user.

At step S12, the Issuing Authority 50 generates a template (or description document) specifying the structure of the hash tree. The template specifies what attribute is used to build the hash comprised in each leaf node. In other words, the template specifies the position assigned to each attribute of the set. For example the attribute 10 can be assigned to the fourth leaf node 24 as shown at FIG. 4.

In one embodiment, the template may comprise the list of all nodes (belonging to the hash tree) and their associated parent node. In another embodiment, the template may comprise the list of all nodes (belonging to the hash tree) and their associated child nodes.

At step S14, the Issuing Authority generates a signature of the root node of the hash tree. This signature can be generated using a private key allocated to the Issuing Authority so that any entity can check the validity of the signature using the public key (corresponding to the private key) of the Issuing Authority. The signature can be generated using a secret shared between the Issuing Authority 50 and all verifier devices intended to check the validity of the signature.

At step S16, the Issuing Authority provides a user's device (e.g. first device of FIG. 1) with the binary hash tree, the generated template, the generated signature of the root node and the set of attributes. It is to be noted that the user's device 80 gets the plain value of every attribute of the set. For security reasons, the data can be conveyed between the Issuing Authority and the user's device through a secured communication channel. Well-known secure protocols (based on pre-shared key or PKI for example) can be used to establish a secure session allowing to guarantee confidentiality and integrity of the transferred data. Data transfer may be done without using secure protocols if it is performed in a secure area.

In one embodiment, the set of attributes may comprise personal data of a passport or a driving license document.

Figure 3:
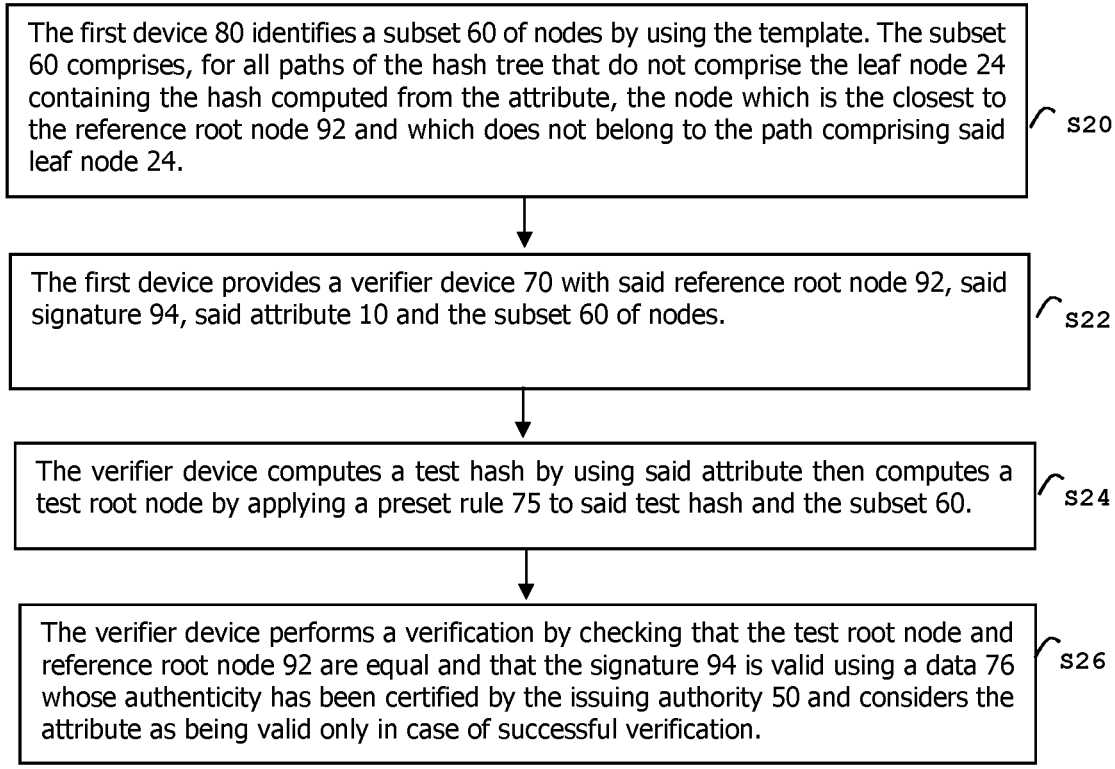
FIG. 3 depicts a flow chart for controlling the validity of one attribute on the field according to an example of the invention.

FIG. 3 shows a flow chart for controlling the validity of an attribute on the field according to an example of the invention.

The validity of a target attribute stored in the first device 80 is supposed to be checked by the verifier device 70.

The root node of the hash tree stored in the user's device 80 is known as the reference root node.

At step S20, the first device 80 identifies a subset 60 of nodes of the hash tree associated to the target attribute. By using the template associated to the hash tree 90, the first device 80 identifies the subset of nodes that comprises, for all paths of the hash tree that do not comprise the leaf node containing the hash computed from the target attribute, the node which is the closest to the reference root node and which does not belong to the path comprising the leaf node.

By reference to FIG. 4, assuming that the target attribute is the attribute 10 whose hash is stored in the leaf node 24, the first device 80 identifies the subset consisting of the following nodes (marked with a star): the leaf node 23 (AH3), the branch node 210 (HL2.1) and the branch node 110 (HL1.1).

Note that the leaf node 23 correspond to the node which is the closest to the reference root node for the path connecting the leaf node 23 and which does not belong to the path comprising the leaf node 24.

Note that the branch node 210 correspond to the node which is the closest to the reference root node for the paths connecting the leaf nodes 21 and 22 and which does not belong to the path comprising the leaf node 24.

Note that the branch node 110 correspond to the node which is the closest to the reference root node for the paths connecting the leaf nodes 25 to 28 and which does not belong to the path comprising the leaf node 24.

At step S22, the first device 80 provides the verifier device 70 with the reference root node of the hash tree, the signature of the reference root node, the target attribute and the identified subset 60 of nodes.

The processing flow above may be delivered by the user's device 80 to the verifier device in the shape of a script like JSON or a meta-language like XML or encoded like Concise Binary Object representation (CBOR) or BER-TLV or DER-TLV (with ASN.1 definition) or any other script language. The processing flow may be as well conveyed to the verifier device as ordered parameters of an API entry points.

Preferably the exchange format is chosen so that to ensure a good level of interoperability.

It is to be noted that the verifier device 70 gets the plain value of the target attribute. The attribute can be coded in any relevant language like ASCII, base64, UTF8 (Universal Character Set Transformation Format—8 bits) or JSON (JavaScript Object Notation) script for instance.

For security reasons, the data can be conveyed between the first device 80 and the verifier device 70 through a secured communication channel. Well-known secure protocols (based on pre-shared key or PKI for example) can be used to establish a secure session allowing to guarantee confidentiality and integrity of the transferred data.

Preferably, data sent from the first device 80 to the verifier device 70 are ordered in a predefined order so that the verifier device 70 can deduce the meaning of each received items. For instance sent data may be ordered as follows: {reference root node, signature, attribute to be verified and nodes of the identified subset 60 ordered from the highest depth to the lowest depth}.

Preferably, the attributes different from the target attribute are not provided to verifier device 70.

It is to be noted that branch and leaf nodes that do not belong to the identified subset 60 do not need to be sent to the verifier device 70.

At step S24, the verifier device 70 computes a test hash by using the target attribute (i.e. plain value of the attribute) then computes a test root node by applying a preset rule 75 to the test hash and the received subset 60 of nodes.

By reference to FIG. 4, assuming that the target attribute is the attribute 10, the preset rule 75 can be the following sequential algorithm:

Computes AH4_Test as a hash of the attribute 10 using SHA-2 algorithm,

Computes HL2.2_Test as a hash of the concatenation of the content of leaf node 23 (AH3) and AH4_Test.

Computes HL1.2_Test as a hash of the concatenation of content of the node 210 (HL2.1) and HL2.2_Test.

Computes test root node as a hash of the concatenation of HL1.2_Test and content of the node 110 (HL1.1).

Preferably, the preset rule 75 can be designed to take into account the number of nodes belonging to the received subset 60 of nodes to deduce the depth of the hash tree and to fit the processing. (I.e. to select the relevant number of computation treatments to build the test root node.)

At step S26, the verifier device performs a verification by checking that the test root node and the reference root node are equal and that the signature of the reference root node is valid using a data 76 whose authenticity is certified by the issuing authority 50. The data 76 can be directly certified by the issuing authority 50. The verifier device concludes that the attribute is valid only in case of successful verification.

It is to be noted that the order of the above-presented sequential algorithm and steps may be modified without altering the final generated result. For instance, the checking of validity of the signature of the reference root node can be done before or during step S24.

In one embodiment, the signature of the reference root node can be generated by enciphering the content of the reference root node using a cryptographic algorithm and a key whose authenticity is certified by the issuing authority. In this embodiment, at step S22, the signature (of the reference root node), which is provided by the first device 80 to the verifier device 70, has a dual role: It is both the signature of the reference root node and it provides the value (in encrypted form) of the reference root node. In this embodiment, at step S26, the verifier device can first decrypt the signature (using data 76) to retrieve the value of the reference root node and then compare the retrieved value of the reference root node with the test root node. Then the verifier device concludes that the attribute is valid only in case of successful comparison. In such a case the checking of the signature is implicitly controlled during the comparison operation.

The verifier device 70 may get the data 76 from the Issuing Authority 50.

The verifier device 70 is assumed to have been previously provided with the preset rule 75 and the relevant hash algorithm.

In one embodiment, a seed (which can be a random value or predefined value) may be provided to both the issuing authority and the verifier device. The issuing authority may use the seed to generate the hash corresponding to the leaf nodes and the verifier device may use the seed to generate the hash of the attribute to check. For instance, the hash may be computed by applying the SHA-3 algorithm to the concatenation of the attribute and the seed.

In one embodiment, the issuing authority 50 may certify a private key which is allocated to the user's device 80. The user's device 80 may generate the signature of the reference root node by using the certified private key.

In one embodiment the user's device 80 (i.e. first device) can modify the structure of the hash tree and update accordingly the template describing the structure of the hash tree. The user's device 80 can either request the issuing authority 50 to sign the newly generated reference root node, or sign it with a private key endorsed by a certificate issued by the issuing authority 50.

When the user's device 80 updates the structure of the hash tree and computes a new signature of the new root node, the template describing the structure of the new hash tree is regenerated by the user's device 80 which can keep it without sharing it with the Issuing Authority 50.

The template may be expressed in any relevant format like HTML, XML, CBOR or BER-TLV for instance.

Update of the structure of the hash tree can also be carried out by the Issuing authority 50 which populates again the user's device 80 with the updated hash tree, associated root node and signature of the root node.

The user's device 80 may be provisioned with a plurality of hash trees, their corresponding templates and associated root hashes; the plurality of hash trees being associated with a common list of attributes. The user's device 80 can be configured to select and use one of these hash trees randomly or according a preset selection algorithm. For instance, the user's device 80 can select and use a hash tree according to a predefined order. Such embodiments ensure a better privacy for attributes which are personal data and reduce possibility to track users.

Figure 5:
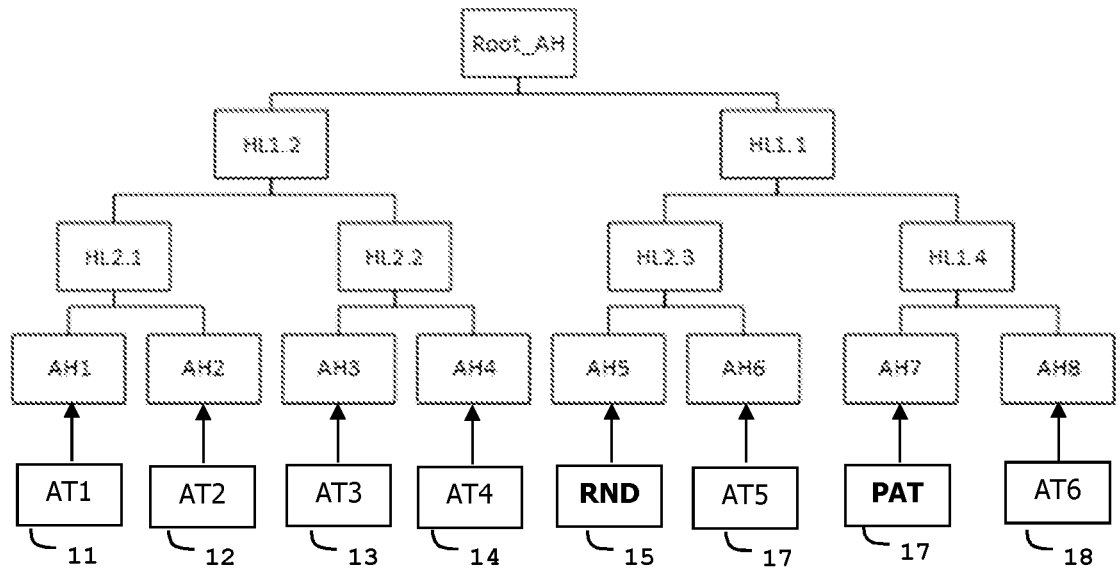
FIG. 5 depicts a diagram showing a hash three according to a second example of the invention.

FIG. 5 shows a diagram showing a binary hash three according to another example of the invention.

If the total number of attributes is lower than the number of leaf nodes of the hash tree, the Issuing Authority 50 can complete the list of attributes with fake attributes whose value is chosen at random and/or filled with a default pattern (fixed pattern).

For example two fake attributes have been added for creating the hash three of FIG. 5: The attribute 15 comprises a random value (RND) and the attribute 17 contains a fixed pattern (PAT). The fixed pattern may be for instance "Empty", "meaningless claim", or "01234".

Genuineness and validity of the six other attributes have been checked by the Issuing Authority 50 that created the hash AH1 from the attribute 11, the hash AH2 from the attribute 12, . . . , the hash AH4 from the attribute 14, the hash AH6 from the attribute 15 and the hash AH8 from the attribute 18.

It is to be noted that the structure of the binary hash tree can be modified either by changing the order of the attributes (e.g.: permutation of attribute 12 and attribute 17) or by changing the content of at least one fake attribute.

Thanks to the invention, only the reference root node need to be signed; all other intermediates hashes of the hash tree involved in the computation of the root node do not need to be signed.

An advantage of the invention is to ensure that only the attribute whose validity must be verified is disclosed to the verifier device. Value of the other attributes can remain hidden from the verifier device. Similarly, the verifier device does not need to access the template of the used hash tree.

By implementing a swap from a hash tree to another one and/or the generation of leaf hashes based on an additional seed, it is possible to deploy a solution robust against replay or guessing other attributes value.

The invention allows to express the attribute in any language and encoding.

The architecture of the system shown at FIG. 1 and the structure of the hash tree of FIG. 4 are provided as examples only. They may be different.

For example, the system may comprise several user's devices (allocated to as many users) and a plurality of verifier devices.

In one embodiment, the user's device may comprise a secure element (like a removable or embedded smart card) which securely stores the hash tree, the list of attributes, the reference root node and its associated signature.

For example, the hash tree can have a depth equal to 3 or 15. Although described for a binary hash tree, the invention also applies to other types of hash tree. For example, each branch node may have three child nodes.

The hash algorithm used to compute the hashes stored in leaf nodes may be different from the hash algorithm used to compute the hashes stored in branch nodes.

When a large number of attributes need to be managed, it is possible to distribute the attributes in several hash trees. In other words, in order to limit the depth of a big hash tree, it may be useful to build several hash trees (and associated templates) each with a limited number of attributes.

Although described for controlling validity of one attribute, the invention may allow to check validity of several attributes attached to a hash tree.

The invention claimed is:

1. A computer-implemented method for controlling validity of an attribute allocated to a user, a first device comprising a memory that stores a hash tree including a reference root node,
characterized in that an issuing authority having agreed to generate a signature of said reference root node after having successfully checked that the attribute is valid, in that a first hash computed by applying a hash algorithm to said attribute is stored in a leaf node belonging to said hash tree, in that the structure of said hash tree is defined in a template stored in said memory, said template specifying what attribute is used to build the hash comprised in each leaf node of the hash tree, in that said attribute and the signature are stored in said memory and in that the method comprises the steps:
the first device identifies a subset of nodes by using said template, said subset comprising, for all paths of the hash tree that do not comprise said leaf node, the node which is the closest to the reference root node and which does not belong to the path comprising said leaf node,
the first device provides a verifier device with said reference root node, said signature, said attribute and said subset,
the verifier device computes a test hash by using said attribute then computes a test root node by applying a preset rule to said test hash and said subset, and
the verifier device performs a verification by checking that said test root node and reference root node are equal and that the signature is valid using a data whose authenticity is certified by the issuing authority and considers the attribute as being valid only in case of successful verification.

2. The computer-implemented method according to claim 1, wherein said attribute is an assertion allocated to the user.

3. The computer-implemented method according to claim 1, wherein said attribute comprises a personal data of a passport of the user or a driving license document of the user.

4. The computer-implemented method according to claim 1, wherein data provided by the first device to the verifier device are in a predefined order.

5. The computer-implemented method according to claim 1, wherein said first hash is computed by using both said attribute and a random value which is provided to the issuing authority and the verifier device.

6. The computer-implemented method according to claim 1, wherein the hash tree comprises a leaf node comprising a hash generated from an attribute set to either a random value or a fixed pattern.

7. The computer-implemented method according to claim 1, wherein the issuing authority generates the signature and provides said signature to the first device.

8. The computer-implemented method according to claim 1, wherein the issuing authority certifies a private key allocated to the first device and wherein the first device generates the signature by using said private key.

9. The computer-implemented method according to claim 1, wherein said first device modifies the structure of said hash tree and updates accordingly said template and wherein the first device triggers an update of the signature of the reference root node of said hash tree.

10. A first device comprising a processor and a memory that stores a hash tree including a reference root node,
characterized in that an issuing authority having agreed to generate a signature of said reference root node after having successfully checked that an attribute allocated to a user is valid, in that a first hash computed by applying a hash algorithm to said attribute is stored in a leaf node belonging to said hash tree, in that the structure of said hash tree is defined in a template stored in said memory, said template specifying what attribute is used to build the hash comprised in each leaf node of the hash tree, in that said attribute and the signature are stored in said memory and in that the first device is configured to identify a subset of nodes by using said template, said subset comprising, for all paths of the hash tree that do not comprise said leaf node, the node which is the closest to the reference root node and which does not belong to the path comprising said leaf node, and in that the first device is configured to provide a verifier device with said reference root node, said signature, said attribute and said subset of nodes.

11. The first device according to claim 10, wherein said attribute belong to a list of attributes which is associated with said hash tree, wherein the first device comprises another hash tree associated with said list of attributes and wherein the first device is configured to select one of the hash trees associated with said list either randomly or according to a predefined order.

12. The first device according to claim 11, wherein each attribute belonging to said list of attributes is an assertion allocated to said user.

13. The first device according to claim 10, wherein said attribute comprises a personal data of a passport of the user or a driving license document of the user.

14. A system comprising a first device and a verifier device,
wherein the first device:
stores a hash tree including a reference root node,
identifies a subset of nodes by using a template specifying what attribute is used to build the hash comprised in each leaf node of the hash tree, said subset comprising, for all paths of the hash tree that do not comprise a leaf node, the node which is the closest to the reference root node and which does not belong to the path comprising said leaf node, and
provides the verifier device with said reference root node, a signature, an attribute and said subset of nodes,
and,
wherein the verifier device:
computes a test hash by using said attribute then computes a test root node by applying a preset rule to said test hash and said subset, and
performs a verification by checking that said test root node and reference root node are equal and that the signature is valid using a data whose authenticity is certified by an issuing authority and considers the attribute as being valid only in case of successful verification,
responsive to
the issuing authority having agreed to generate a signature of said reference root node after having successfully checked that the attribute is valid, in that a first hash computed by applying a hash algorithm to said attribute is stored in a leaf node belonging to said hash tree, in that the structure of said hash tree is defined in a template stored in said memory, in that said attribute and signature are stored in said memory.

\* \* \* \* \*